US011562206B2

(12) United States Patent
Agnihotram

(10) Patent No.: US 11,562,206 B2
(45) Date of Patent: Jan. 24, 2023

(54) SYSTEM AND METHOD FOR PROVIDING PERSONALIZED DRIVING OR NAVIGATION ASSISTANCE

(71) Applicant: Wipro Limited, Bangalore (IN)

(72) Inventor: Gopichand Agnihotram, Bangalore (IN)

(73) Assignee: Wipro Limited, Bangalore (IN)

(*) Notice: Subject to any disclaimer, the term of this patent is extended or adjusted under 35 U.S.C. 154(b) by 563 days.

(21) Appl. No.: 16/695,224

(22) Filed: Nov. 26, 2019

(65) Prior Publication Data

US 2021/0097370 A1   Apr. 1, 2021

(30) Foreign Application Priority Data

Sep. 30, 2019   (IN) .............................. 201941039541

(51) Int. Cl.
*G06N 3/04* (2006.01)
*G01C 21/28* (2006.01)
*G06N 3/08* (2006.01)

(52) U.S. Cl.
CPC .......... *G06N 3/0454* (2013.01); *G01C 21/28* (2013.01); *G06N 3/049* (2013.01); *G06N 3/0445* (2013.01); *G06N 3/088* (2013.01)

(58) Field of Classification Search
CPC ................ G01C 21/28; G01C 21/3484; G01C 21/3641; G01C 21/3697; G06F 3/167; G06N 3/0445; G06N 3/0454; G06N 3/049; G06N 3/088

See application file for complete search history.

(56) References Cited

U.S. PATENT DOCUMENTS

| | | | |
|---|---|---|---|
| 9,298,575 B2 | 3/2016 | Tamari et al. | |
| 9,864,918 B2 | 1/2018 | Micks et al. | |
| 10,394,236 B2 * | 8/2019 | Wiklinska | B60K 28/06 |
| 11,180,158 B1 * | 11/2021 | Lyle | B60W 40/09 |

(Continued)

FOREIGN PATENT DOCUMENTS

CN   110516658 A   * 11/2019

OTHER PUBLICATIONS

Doshi, A., et al., "On-Road Prediction of Driver's Intent with Multimodal Sensory Cues", IEEE, 2011, pp. 22-34.

*Primary Examiner* — Babar Sarwar
(74) *Attorney, Agent, or Firm* — Finnegan, Henderson, Farabow, Garrett & Dunner, LLP

(57) ABSTRACT

This disclosure relates to method and system for providing personalized driving or navigation assistance. The method may include receiving sensory data with respect to a vehicle from a plurality of sensors and multi-channel input data with respect to one or more passengers inside the vehicle from a plurality of onboard monitoring devices, performing fusion of the sensory data and the multi-channel input data to generate multimodal fusion data, determining one or more contextual events based on the multi-modal fusion data using a machine learning model, wherein the machine learning model is trained using an incremental learning process and comprises a supervised machine learning model and an unsupervised machine learning model, analysing the one or more contextual events to generate a personalized driving recommendation, and providing the personalized driving recommendation to a driver passenger or a navigation device.

17 Claims, 5 Drawing Sheets

(56) References Cited

U.S. PATENT DOCUMENTS

| | | | |
|---|---|---|---|
| 11,308,785 B1* | 4/2022 | Hiles | A61B 5/18 |
| 11,351,961 B2* | 6/2022 | Ghannam | B60R 25/20 |
| 2013/0054090 A1 | 2/2013 | Shin et al. | |
| 2013/0079964 A1* | 3/2013 | Sukkarie | G01C 21/3697 |
| | | | 701/1 |
| 2016/0035150 A1 | 2/2016 | Barfield, Jr. et al. | |
| 2016/0267396 A1* | 9/2016 | Gray | G06N 20/00 |
| 2017/0200449 A1* | 7/2017 | Penilla | G10L 21/0208 |
| 2018/0012089 A1* | 1/2018 | Ricci | G07C 5/0858 |
| 2019/0111942 A1* | 4/2019 | Suzuki | B60W 50/082 |
| 2019/0184998 A1* | 6/2019 | Zheng | B60W 40/09 |
| 2019/0213429 A1* | 7/2019 | Sicconi | G06F 3/0346 |
| 2019/0361437 A1* | 11/2019 | Wilson | G06F 40/58 |
| 2020/0216066 A1* | 7/2020 | Aggoune | B60W 40/04 |
| 2020/0334762 A1* | 10/2020 | Carver | G06Q 40/08 |
| 2020/0379460 A1* | 12/2020 | Stent | G06V 20/597 |

* cited by examiner

SYSTEM AND METHOD FOR PROVIDING PERSONALIZED DRIVING OR NAVIGATION ASSISTANCE

TECHNICAL FIELD

This disclosure relates generally to advanced driver-assistance systems and more particularly to method and system for providing personalized driving or navigation assistance.

BACKGROUND

Most road accidents occur due to human error. Advanced driver-assistance systems (ADAS) are systems deployed in a vehicle in order to aid a driver of the vehicle and to reduce human error. The ADAS automate, adapt, and enhance vehicle systems, thereby providing for increased vehicle/road safety. Today, ADAS employs various techniques to assist the driver in parking the vehicle, navigating the vehicle, providing alerts/warnings to the driver in case of anomalies, and so forth.

Some of the existing techniques provide for predicting driver's intent using multi-modal sensory cues and uses machine learning to understand what the driver intends to do in the immediate future and avoid dangerous situations. For example, the existing techniques may predict driver intent by associating driver's body language with vehicle movement using machine learning. Further, existing techniques provide for analysis of multimodal inputs from various sets of sensors to provide real-time detection on lane changing, speeding, braking, and so forth.

However, existing ADAS fail to provide for enhanced or personalized driving experience. Additionally, existing techniques fail to provide any information with respect to anomalies that affects vehicle states, required system repairs due to anomalies, emotions/gestures of co-passengers, driver intentions, required alerts or actions due to emotions/gestures of the co-passengers and driver intentions, and so forth.

SUMMARY

A method of providing personalized driving assistance is disclosed. The method may include receiving sensory data with respect to a vehicle from a plurality of sensors and multi-channel input data with respect to one or more passengers inside the vehicle from a plurality of onboard monitoring devices. The method may further include performing fusion of the sensory data and the multi-channel input data to generate multi-modal fusion data. The method may further include determining one or more contextual events based on the multi-modal fusion data using a machine learning model. The machine learning model is trained using an incremental learning process and comprises a supervised machine learning model and an unsupervised machine learning model. The method may further include analyzing the one or more contextual events to generate a personalized driving recommendation. The method may further include providing the personalized driving recommendation to a driver passenger or a navigation device.

In one embodiment, a system for providing personalized driving assistance is disclosed. In one example, the system may include a driver assistance device, which may include at least one processor and a memory communicatively coupled to the at least one processor. The memory may store processor-executable instructions, which, on execution, may cause the processor to receive sensory data with respect to a vehicle from a plurality of sensors and multi-channel input data with respect to one or more passengers inside the vehicle from a plurality of onboard monitoring devices. The processor-executable instructions, on execution, may further cause the processor to perform fusion of the sensory data and the multi-channel input data to generate multi-modal fusion data. The processor-executable instructions, on execution, may further cause the processor to determine one or more contextual events based on the multi-modal fusion data using a machine learning model. The machine learning model is trained using an incremental learning process and comprises a supervised machine learning model and an unsupervised machine learning model. The processor-executable instructions, on execution, may further cause the processor to analyze the one or more contextual events to generate a personalized driving recommendation. The processor-executable instructions, on execution, may further cause the processor to provide the personalized driving recommendation to a driver passenger or a navigation device.

In one embodiment, a non-transitory computer-readable medium storing computer-executable instructions for providing personalized driving assistance is disclosed. In one example, the stored instructions, when executed by a processor, may cause the processor to perform operations including receiving sensory data with respect to a vehicle from a plurality of sensors and multi-channel input data with respect to one or more passengers inside the vehicle from a plurality of onboard monitoring devices. The operations may further include performing fusion of the sensory data and the multi-channel input data to generate multi-modal fusion data. The operations may further include determining one or more contextual events based on the multi-modal fusion data using a machine learning model. The machine learning model is trained using an incremental learning process and comprises a supervised machine learning model and an unsupervised machine learning model. The operations may further include analyzing the one or more contextual events to generate a personalized driving recommendation. The operations may further include providing the personalized driving recommendation to a driver passenger or a navigation device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
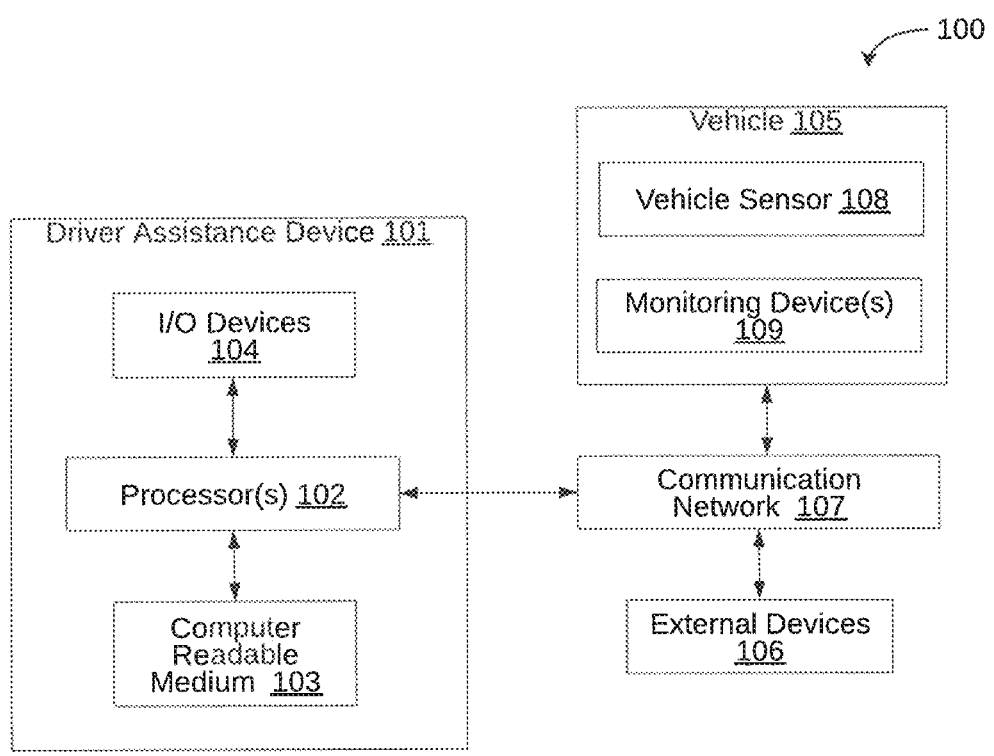
FIG. 1 is a block diagram of an exemplary system for providing personalized driving assistance, in accordance with some embodiments of the present disclosure.

Referring now to FIG. 1, an exemplary system 100 for providing personalized driving assistance to a driver of a vehicle 105 is illustrated, in accordance with some embodiments of the present disclosure. In particular, the system 100 may implement a driver assistance device 101 in order to provide personalized driving assistance to the driver of the vehicle 105. As will be appreciated, the driver assistance device 101 may be any computing device (for example, server, desktop, laptop, notebook, netbook, tablet, smartphone, mobile phone, or the like). Further, as will be appreciated by those skilled in the art, the vehicle 105 may be any vehicle including autonomous vehicle.

The, vehicle 105 may include various vehicle sensors 108 and various onboard monitoring sensors 109 among other components (e.g., engine, battery, drivetrain, etc.). The vehicle sensors 108 may enable capturing sensory data with respect to the vehicle 105. The vehicle sensors 108 may include, but may not be limited to, a GPS sensor for acquiring instant position (i.e., current location) of the vehicle 105, a speedometer for acquiring instant speed of the vehicle 105, an accelerometer for acquiring instant acceleration of the vehicle 105, a gyroscope and a magnetometer for acquiring absolute and instant orientation of the vehicle 105, a brake sensor for acquiring brake data of the vehicle 105, an imaging sensor for acquiring instant image of an environment around the vehicle 105, a humidity sensor for acquiring ambient humidity level, and a temperature sensor for acquiring ambient temperature.

The onboard monitoring sensors 109 may enable capturing multi-channel input data with respect to one or more passengers (i.e., drivers and co-passengers) inside the vehicle 105. The onboard monitoring sensors 109 may include, but may not be limited to, an inside camera for capturing image inside the vehicle 105, a driver passenger face camera for capturing face of the driver, a microphone for capturing voice/speech inside the vehicle, and a driver passenger breath analyzer for capturing breath of the driver.

As will be described in greater detail in conjunction with FIGS. 2-5, the driver assistance device 101 may receive sensory data with respect to the vehicle 105 from the vehicle sensors 108 and multi-channel input data with respect to one or more passengers inside the vehicle 105 from the onboard monitoring devices 109, perform fusion of the sensory data and the multi-channel input data to generate multi-modal fusion data, and determine one or more contextual events based on the multi-modal fusion data using a machine learning model. It should be noted that the machine learning model may be trained using an incremental learning process and comprises a supervised machine learning model and an unsupervised machine learning model. Further, the driver assistance device 101 may analyze the one or more contextual events to generate a personalized driving recommendation and provide the personalized driving recommendation to the driver passenger (or a navigation device in case of an autonomous vehicle).

The driver assistance device 101 may include one or more processors 102, a computer-readable medium (for example, a memory) 103, and an input/output (I/O) device 104. The computer-readable medium 103 may store instructions that, when executed by the one or more processors 102, cause the one or more processors 102 to provide personalized driving assistance, in accordance with aspects of the present disclosure. The computer-readable medium 103 may also store various data (for example, sensory data with respect to the vehicle, multi-channel input data with respect to the passengers, one or more features extracted from the multi-channel input data, unique emotion labels, labelled feature data, multi-modal fusion data, sparse distributed representation (SDR) data, contextual events, machine learning model that may include bi-directional long short-term memory (Bi-directional LSTM) model and hierarchical temporal memory (HTM) model, personalized driving recommendations, historical vehicle usage data, historical behavior data of the driver passenger, or the like) that may be captured, processed, and/or required by the driver assistance device 101. The driver assistance device 101 may interact with a user via a user interface accessible via the I/O devices 104. The driver assistance device 101 may also interact with one or more external devices 106 or with the vehicle 105 over a communication network 107 for sending or receiving various data. The external devices 106 may include, but may not be limited to, a remote server, a digital device, or another computing system.

Figure 2:
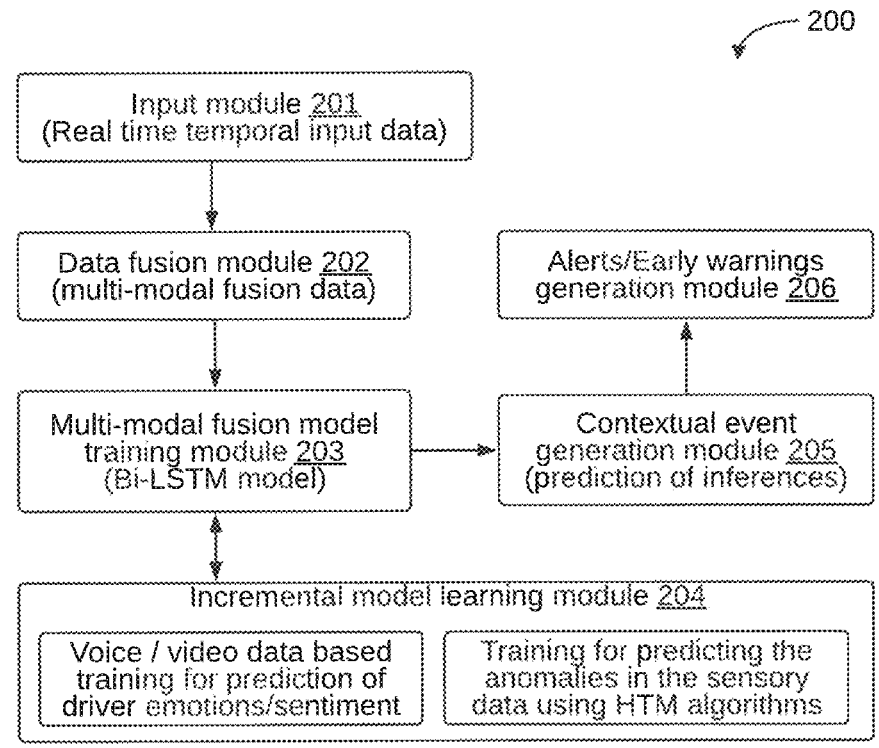
FIG. 2 is a functional block diagram of a driver assistance device, in accordance with some embodiments of the present disclosure.

Referring now to FIG. 2, a functional block diagram of a driver assistance device 200, analogous to the driver assistance device 101 of FIG. 1, is illustrated, in accordance with some embodiments of the present disclosure. The driver assistance device 200 may include various modules that perform various functions in order to provide personalized driving assistance. In some embodiments, the driver assistance device 200 may include an input module 201, a data fusion module 202, a multi-modal fusion model (i.e., supervised machine learning model) training module 203, an incremental model (i.e., unsupervised machine learning model) learning module 204, a contextual event generation module 205, and an alerts or early warnings generation module 206. As will be appreciated, in some embodiments, the driver assistance device 101 may also include various other modules than those mentioned above in order to control and navigate the autonomous vehicle. Further, as will be appreciated by those skilled in the art, all such aforementioned modules 201-206 may be represented as a single module or a combination of different modules. Moreover, as will be appreciated by those skilled in the art, each of the modules 201-206 may reside, in whole or in parts, on one device or multiple devices in communication with each other.

The input module 201 may receive real-time temporal input data provided from various onboard vehicle sensors 108 (e.g., accelerometer, gyroscope, magnetometer, break sensor, imaging device, etc.) and various onboard monitoring devices 109 (e.g., inside camera, face camera, microphone, breath analyzer, etc.). The real-time temporal input data from various sources (i.e., sensory data and multi-channel input data (e.g., voice data, video data, etc.)) may be then provided as multi-modal inputs to the data fusion module 202. The data fusion module 202 may combine the multi-modal inputs (i.e., real-time temporal input data from various sources) as multi-modal fusion data. The multi-modal fusion data may be then sent to the machine learning model for prediction of contextual events.

The machine learning model may include a multi-modal fusion model (i.e., supervised machine learning model) and an incremental model (i.e., unsupervised machine learning model). The machine learning model may be trained using an incremental learning process to predict inferences or contextual events. In particular, the multi-modal fusion model training module 203 may train a machine learning model (e.g., Bidirectional LSTM model). Further, the incremental model learning module 204 may employ any unsupervised learning techniques (e.g., HTM technique) to ensure incremental learning of the machine learning model. By way of an example, the training may be performed as follows:

a) Training based on multi-channel input data: The machine learning model may be trained to extract features from multi-channel input data (e.g., voice/video data) and to integrate the extracted features with unique emotion labels. In some embodiments, voice data may be converted as text input using speech recognition tools (e.g., Kaldi ASR). The textual features may be then extracted and integrated with labelled emotion information. Thus, all the extracted features of multi-channel input data (voice data, video data, textual data) are integrated with uniquely labelled emotion information for training a supervised machine learning model (e.g., Bi-directional LSTM model) to predict the driver actions, emotions, etc.

b) Training for predicting anomalies: The machine learning model may be further trained to predict anomalies in vehicle parts, movements (e.g., in autonomous vehicles), and driver behavior using unsupervised learning method such as hierarchical temporal memory (HTM) method. It should be noted that the HTM method may predict these anomalies without getting any training data as input.

The contextual event generation module 205 may employ the knowledge learnt through the incremental learning process to predict inferences or contextual events. The contextual events may include, but may not be limited to, emotions or sentiments of passengers (i.e., driver and co-passengers), actions or gestures of passengers, anomalies in vehicle parts, anomalies in vehicle movements (e.g., in autonomous vehicles), and anomalies in driver behavior (e.g., in ADAS enabled vehicles).

The alerts or early warnings generation module 206 may receive inferences or contextual events predicted by the contextual event generation module 205. The alerts or early warnings generation module 206 may then analyze the driver's gestures, emotions, etc. to predict events such as driver's intention to change lane, overtake, etc. The alerts or early warnings generation module 206 may, therefore, provide necessary alerts/warnings (e.g., providing alert in case of prediction of driver drowsiness, lane change, etc.) in order to assist the driver. In case of autonomous vehicles, for providing similar alerts to the navigation device, passenger's gestures, emotions, etc. may be analyzed. Additionally, alerts may be generated regarding the state of the vehicle based on prediction of anomalies in vehicle parts (i.e., components) or vehicle movement. In other words, necessary alerts/warnings may be generated to provide driving personalization regarding vehicle state, component repair, etc. based on anomalies predicted in vehicle movement, vehicle parts/movements (in autonomous vehicles), driver behavior (in advanced driver-assistance system (ADAS) enabled vehicles). Further, the alerts or early warnings generation module 206 may provide personalized feedback at the end of each drive to the driver or the driver agency.

It should be noted that all such aforementioned modules 201-206 may be implemented in programmable hardware devices such as programmable gate arrays, programmable array logic, programmable logic devices, or the like. Alternatively, all such aforementioned modules 201-206 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together, but may include disparate instructions stored in different locations which, when joined logically together, comprise the module and achieve the stated purpose of the module. Indeed, a module of executable code may be a single instruction, or many instructions, and may even be distributed over several different code segments, among different applications, and across several memory devices.

As described above, the driver assistance device 200 may provide for driving personalization based on generation of contextual events using supervised and unsupervised machine learning techniques. The generation of contextual events may include predicting driver actions/emotions/gestures and predicting anomalies in driver behavior/vehicle components using sensory data (vehicle parameters from sensors installed in the vehicle) and multi-channel input data (video/voice data from monitoring devices present in the vehicle). The prediction of driver actions may include predicting real time events such as lane change, over-taking, driver's drowsiness, drinking prediction, vehicle acceleration, turning deviations, and so forth. The prediction of anomalies may include predicting anomalies in driver behavior, finding new pattern in behavior, computing vehicle state, and so forth. In addition to prediction of driver actions and anomalies, the driver assistance device 200 may provide feedback for providing enhanced driving performance. The driver assistance device 200 described above may be used in autonomous vehicles, semi-autonomous vehicles as well as in ADAS enabled vehicles.

The driver assistance device 200 may perform prediction of contextual events by deriving an inference from multi-modal fusion data, which may be generated by fusion of multi-channel input data and sensory data. By way of an example, the data derived from cameras/image frames may be referred as multi-channel input data which includes voice data, video data, and textual data captured by various cameras (such as face camera, hand camera, outside camera, GPS data, etc.) present in the vehicle. The generated multi-channel input data may be labelled with information of emotions. The labelled emotion information may be such as happiness, sadness, neutral, surprise, disgust, etc. The multi-channel input data along with their extracted features are integrated with uniquely labelled information and used for training a supervised machine learning model. The trained machine learning model may predict driver's emotions or driver's intentions (such as lane changing, driver's intention to overtake, driver drowsiness, etc.). In case of autonomous vehicle systems, the machine learning model may also predict the emotion/gestures of the co-passengers or the state of the vehicle.

Further, the sensory data derived from various onboard sensors (such as accelerometer sensor, gyroscope sensor, magnetometer sensor, brake sensor, etc.) may be used to predict any anomaly in vehicle components or driver's behavior using unsupervised machine learning method such as HTM method. The multi-channel input data and the sensory data may be matched to derive at a common inference, thereby triggering the generation of contextual events. For example, the multi-channel input data may provide information that the driver is angry, and he is planning to overtake or change lane. Similarly, using the sensory variables, an anomaly in driver behavior may also be obtained. Hence, such information obtained from multi-channel input data and the sensory data may be matched to derive at a common inference and a contextual event, indicating that the driver is angry and is planning to change lane, is generated. With the generation of contextual events, the driver assistance device 200 may analyze the driver's gestures, emotions, etc. and may predict events such as driver's intention to change lane, overtake, etc. prior to actual event. Hence, necessary alerts or warnings may be generated for assisting the driver. In case of autonomous vehicles, for providing similar alerts to the navigation device, passenger's gestures, emotions may be analyzed, and alerts may be generated regarding the state of the vehicle.

The multi-channel input data consisting of raw voice data, video data, and textual data may be collected, and their features may be extracted for training a supervised machine learning model to predict driver emotions/gestures, etc. The raw voice data may include features such as energy, zero crossing rate, entropy of energy, spectral centroid, spectral spread, spectral entropy, spectral flux, spectral roll-off, mel-frequency cepstral coefficient (MFCC), chroma vector, chroma deviation, etc. The raw video/images data may include features such as facial key points, textual features, color, etc. The extraction of features from multi-channel input data is explained in greater detail herein below.

Let the voice data be $vo_i$, video data be $vd_i$, text data be $txt_i$, the labelled emotion information be ink and the interval for voice, video, and text data be $[t_i, t_{i+1}]$ where i=1, 2, ..., n. The labelled emotion may have different values. For example, it may have five values such as happiness, sadness, neutral, surprise, and disgust. For each of the $vo_i$, $vd_i$, $txt_i$ data in the interval $[t_i, t_{i+1}]$, features may be extracted from raw data. For example, the features of voice data $vo_i$ in each of the interval of $[t_i, t_{i+1}]$ may be extracted as given below:

$$vo_i = (f_{ii})$$

where, $f_{ij}$ for each i=1, 2, ..., n; j=1, 2, ..., n are the features associated with voice data in each of the interval of $[t_i, t_{i+1}]$. Thus, $$vo_1 = (f_{11}, f_{12}, \ldots, f_{1n}); vo_2 = (f_{21}, f_{22}, \ldots, f_{2n}); \ldots vo_i = (f_{i1}, f_{i2}, \ldots, f_{in})$$

Similarly, the features of video data $vd_i$ in each of the interval of $[t_i, t_{i+1}]$ may be extracted as given below:

$$vd_i = g_{ii}$$

where, $g_{ij}$ for each i=1, 2, ..., n; j=1, 2, ..., n are the features associated with video data in each of the interval of $[t_i, t_{i+1}]$. Thus, $$vd_1 = (g_{11}, g_{12}, \ldots, g_{1n}); vd_2 = (g_{21}, g_{22}, \ldots, g_{2n}); \ldots vd_i = (g_{i1}, g_{i2}, \ldots, g_{in})$$

Further, the features of textual data $txt_i$ in each of the interval of $[t_i, t_{i+1}]$ may be extracted as explained herein.

From voice input data, voice may be converted into text using any speech recognition tools (e.g., Kaldi ASR). From the converted textual information, textual features can be extracted using Python tokenize library. The extracted features may be integrated with labelled emotion information. The features of textual data $txt_i$ in each of the interval of $[t_i, t_{i+1}]$ may be extracted as given below:

$$txt_i = txt_{ii}$$

where, $txt_{ij}$ for each of i=1, 2, ..., n; j=1, 2, ..., n are the features associated with textual data in each of the interval of $[t_i, t_{i+1}]$. Thus, $$txt_1 = (t_{11}, t_{12}, \ldots, t_{1n}); txt_2 = (t_{21}, t_{22}, \ldots, t_{2n}); \ldots txt_i = (t_{i1}, t_{i2}, \ldots, t_{in})$$

Further, the extracted features of multi-channel input data (voice data, video data, textual data) may be integrated with uniquely labelled emotional information for training a supervised machine learning model (such as Bi-directional LSTM model) to predict the driver actions, emotions, etc. For example, for i=1, 2, ..., n, $(vo_i, vd_i, txt_i, lab_i)$ may be different features of multi-channel input data integrated with uniquely labelled emotional information $lab_i$. Here $lab_i$ are labels such as happy, sad, angry, surprise; $vo_i$ are features associated with the voice; $vd_i$ are the features associated with the video data; and $txt_i$ are the features associated with the voice to textual data. Thus, upon extracting features of video data, voice data, and textual data, the features may be tagged with different emotion labels corresponding to different emotions such as happy, sad, and angry. The integrated data or the labelled feature data may then be employed to train any machine learning model (such as deep learning Bi-directional LSTM model).

By way of an example, for any emotion label, the features may be extracted from video where entropy of energy, spectral centroid, spectral spread, spectral entropy, spectral flux, spectral roll-off, mel-frequency cepstral coefficient (MFCC), chroma vector may be key features of audio portion of the video, while features associated with pixel values of images in floating values may be key features of image portion of the video. Additionally, the features may be extracted from text data derived from voice. For example, 'I am happy to hear this news' may extract a feature keyword has 'happy', etc. In this manner, all the extracted features from different multi-channel input data may be labelled in order to form a vector matrix. The vector matrix represents real values of all extracted features assigned to labelled information of all emotions. An exemplary representation of the vector matrix is given below $$\begin{pmatrix} \text{Happy} \\ \text{Sad} \\ \text{angry} \\ \text{surprise} \end{pmatrix} = \begin{pmatrix} -12.04 & 24.35 & \ldots & 58.65 \\ \vdots & & \ddots & \vdots \\ -23.45 & 0.456 & \ldots & -34.988 \end{pmatrix}$$

The vector matrix may be then employed to train the machine learning model using any of supervised deep learning approach such as Bi-directional LSTM model. The trained model may then predict the emotions in real time. Similarly, the machine learning model may be trained for gestures such as head right, left, up, down etc. using the images pixel information, and the same may be predicted in the real-time. The trained model may be employed to predict anomalies with respect to passengers (driver and co-passenger). This may enable the driver assistance device 200 to alert the driver and co-passenger in adverse scenario.

In ADAS driven vehicles, by predicting driver emotions in advance, it may be possible to know driver's intention to change lane, overtake, etc. beforehand. Hence, necessary alerts/warnings may be provided for assisting the driver. Further, convolutional neural networks (CNN) may be used for predicting the gaze of the driver (e.g., driver looking up, down, left, or right). Using this deep learning CNN, driver gestures (e.g., driver drowsiness, driver yelling at fellow driver, etc.) may be predicted and necessary alerts/warnings/preventive steps may be provided to the driver. The driver assistance device 200 may also provide driver feedback to the driver and the driver agency at the end of every drive.

Further, sensory data derived from various onboard sensors (such as accelerometer sensor, gyroscope sensor, magnetometer sensor, brake sensor, etc.) in the vehicle may be used to predict anomalies in vehicle components/driver's behavior using unsupervised machine learning method such as HTM method. The anomalies may include, but may not be limited to, anomaly in vehicle components (such as brake failure, low battery, etc.), anomalies in driver behavior, anomalies in co-passenger behavior, and identifying new patterns in behavior. Obtaining inference to identify new patterns may include updating the threshold for individual or personalized recommendation on vehicle speed, driver body language, etc. For example, on identifying that the driver has certain habits such as closing eyes frequently, looking at one side while driving which makes him comfortable, etc., these habitual actions are learnt and identified as new pattern. As these actions are learnt by the incremental learning process, the threshold for these actions may be updated and over a period, generation of alerts/warnings/recommendations for these identified new patterns may be avoided as they refer to habitual actions.

Moreover, the HTM method predicts the anomalies in vehicle parts or vehicle movements in autonomous vehicles and anomalies in driver behavior in ADAS driven vehicles without any training data. The predicted anomalies may be useful in knowing the contextual events and providing personalized feedbacks and improvements in both ADAS driven vehicles and autonomous vehicles. The working of HTM method to predict the anomalies is explained in greater detail in conjunction with FIG. 3.

Figure 3:
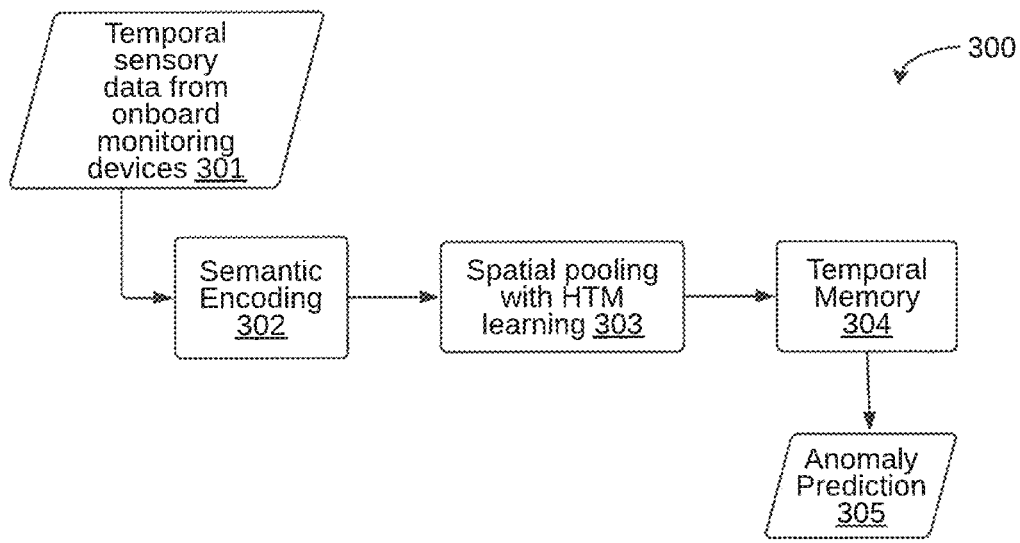
FIG. 3 is a flow diagram of an exemplary process for prediction of anomaly using sensory data, in accordance with some embodiments of the present disclosure.

Referring now to FIG. 3, exemplary process 300 for prediction of anomaly using sensory data via the driver assistance device 200, is depicted via a flow diagram, in accordance with some embodiments of the present disclosure. As illustrated in the flow diagram, at block 301, the HTM method may receive the sensory data that includes real-time temporal data as input from various onboard sensors. At block 302, the sensory data input may be semantically encoded, by a semantic encoder, into a sparse array referred to as sparse distributed representation (SDR) data. It should be noted that semantic encoding is needed to ensure that similar SDR data is generated for similar sensory data (i.e., sensory data that is similar in nature).

At block 303, the encoded SDR may be sent for spatial pooling that consists of HTM learning algorithms. The learning algorithm may be Hebbian learning that learns from a sequence of temporal data. As a sequence of data from various onboard sensors is sent as input repeatedly, the learning algorithm may learn continuously by replacing old patterns with new patterns. At block 304, the spatial spooling process maintains the received input sequence and the patterns learnt using HTM algorithms by a method called temporal memory. Using this temporal memory method and with the knowledge learnt from the sequence of temporal input data, the HTM algorithm may be able to predict new pattern and anomalies in vehicle movement, driver behavior, vehicle component repairs, etc. At block 305, predicted anomalies may be provided to the context event generation module 205.

As will be appreciated by one skilled in the art, a variety of processes may be employed for providing personalized driving assistance. For example, the exemplary system 100 and the associated driver assistance device 101 may provide personalized driving assistance based on incremental learning by the processes discussed herein. In particular, as will be appreciated by those of ordinary skill in the art. control logic and/or automated routines for performing the techniques and steps described herein may be implemented by the system 100 and the associated driver assistance device 101, either by hardware, software, or combinations of hardware and software. For example, suitable code may be accessed and executed by the one or more processors on the system 100 or the associated driver assistance device 101 to perform some or all of the techniques described herein. Similarly, application specific integrated circuits (ASICs) configured to perform some or all of the processes described herein may be included in the one or more processors on the system 100 or on the associated driver assistance device 101.

Figure 4:
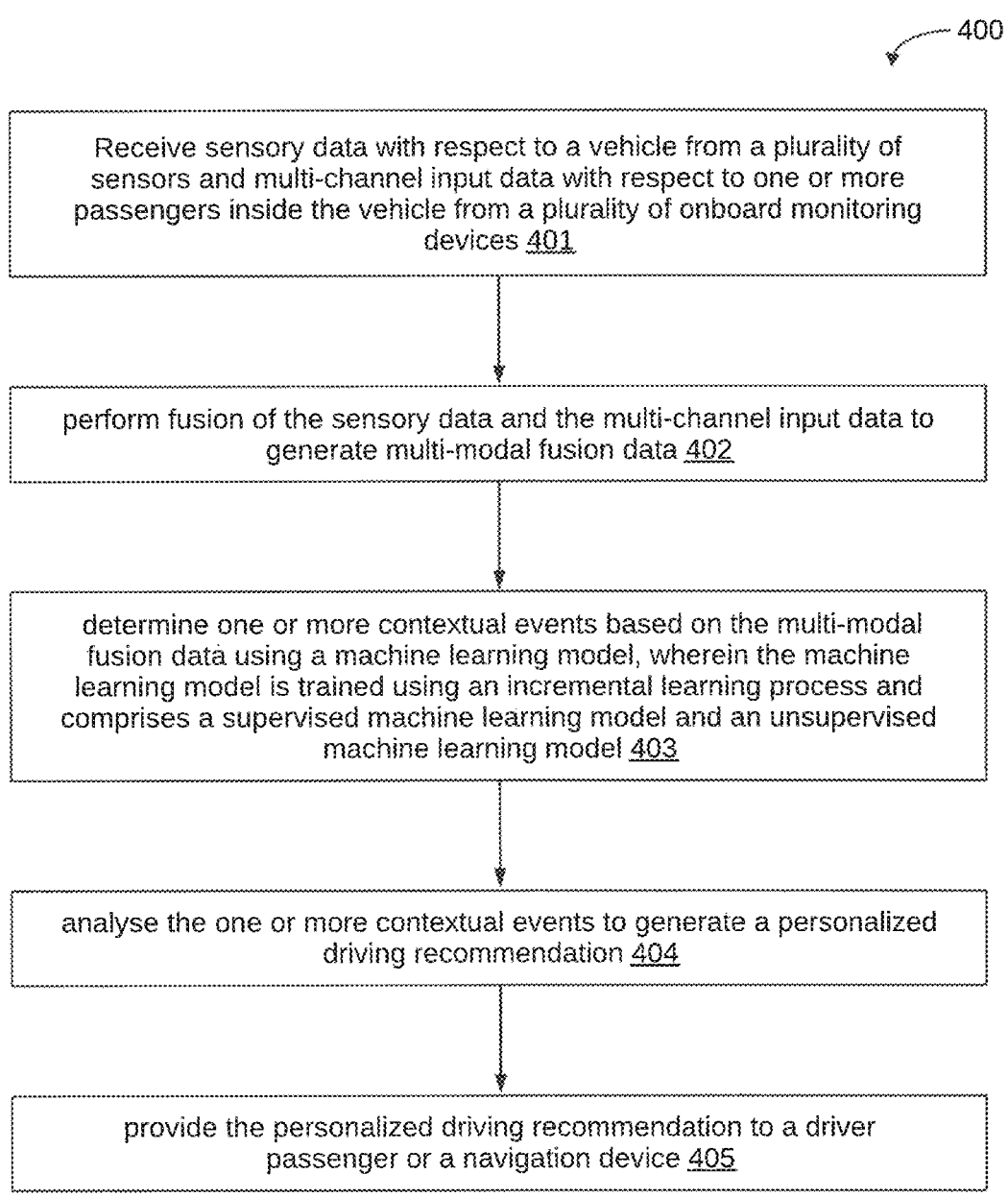
FIG. 4 is a flow diagram of an exemplary process for providing personalized driving assistance, in accordance with some embodiments of the present disclosure.

For example, referring now to FIG. 4, exemplary control logic 400 for providing personalized driving assistance via a system/device, such as the system 100 or the associated driver assistance device 101, is depicted via a flowchart, in accordance with some embodiments of the present disclosure. As illustrated in the flowchart, the control logic 400 may include the steps of receiving sensory data with respect to a vehicle from a plurality of sensors and multi-channel input data with respect to one or more passengers inside the vehicle from a plurality of onboard monitoring devices at step 401, performing fusion of the sensory data and the multi-channel input data to generate multi-modal fusion data at step 402, and determining one or more contextual events based on the multi-modal fusion data using a machine learning model at step 403. It should be noted that the machine learning model may be trained using an incremental learning process and may include a supervised machine learning model and an unsupervised machine learning model. Further, the control logic 400 may include the steps of analyzing the one or more contextual events to generate a personalized driving recommendation at step 404 and providing the personalized driving recommendation to a driver passenger or a navigation device at step 405.

It should be noted that, in some embodiments, the plurality of sensors may include, but may not be limited to, an accelerometer, a speedometer, a gyroscope, a magnetometer, a brake sensor, an outside imaging sensor, a GPS sensor, a humidity sensor, or a temperature sensor. Additionally, it should be noted that, in some embodiments, the plurality of onboard monitoring devices may include, but may not be limited to, an inside camera, a driver passenger face camera, a microphone, or a driver passenger breath analyzer.

In some embodiments, performing fusion to generate multi-modal fusion data at step 302 may include the step of performing fusion of at least one of historical vehicle usage data and historical behavior data of the driver passenger with the multi-channel input data and the sensory data.

Additionally, in some embodiments, training the machine learning model using the incremental learning process may include the steps of extracting one or more features from the multi-channel input data, labelling each of the one or more features with a unique emotion label to generate a labelled feature data, and performing a supervised training of the supervised machine learning model with the labelled feature data to determine the one or more contextual events. It should be noted that, in such embodiments, the supervised machine learning model may be a bi-directional LSTM model. Further, in such embodiments, the one or more contextual events may include, but may not be limited to, an action, a gesture, or an emotion of the one or more passengers.

Further, in some embodiments, training the machine learning model using the incremental learning process may further include the steps of semantically encoding the sensory data to generate SDR data, and performing an unsupervised training of the unsupervised machine learning model with the SDR data to determine one or more contextual events. It should be noted that, in such embodiments, the unsupervised machine learning model may be a HTM model. Further, in such embodiments, the one or more contextual events may include anomalies in a component of the vehicle, a movement of the vehicle, a behavior of the one or more passengers, and so forth.

Figure 5:
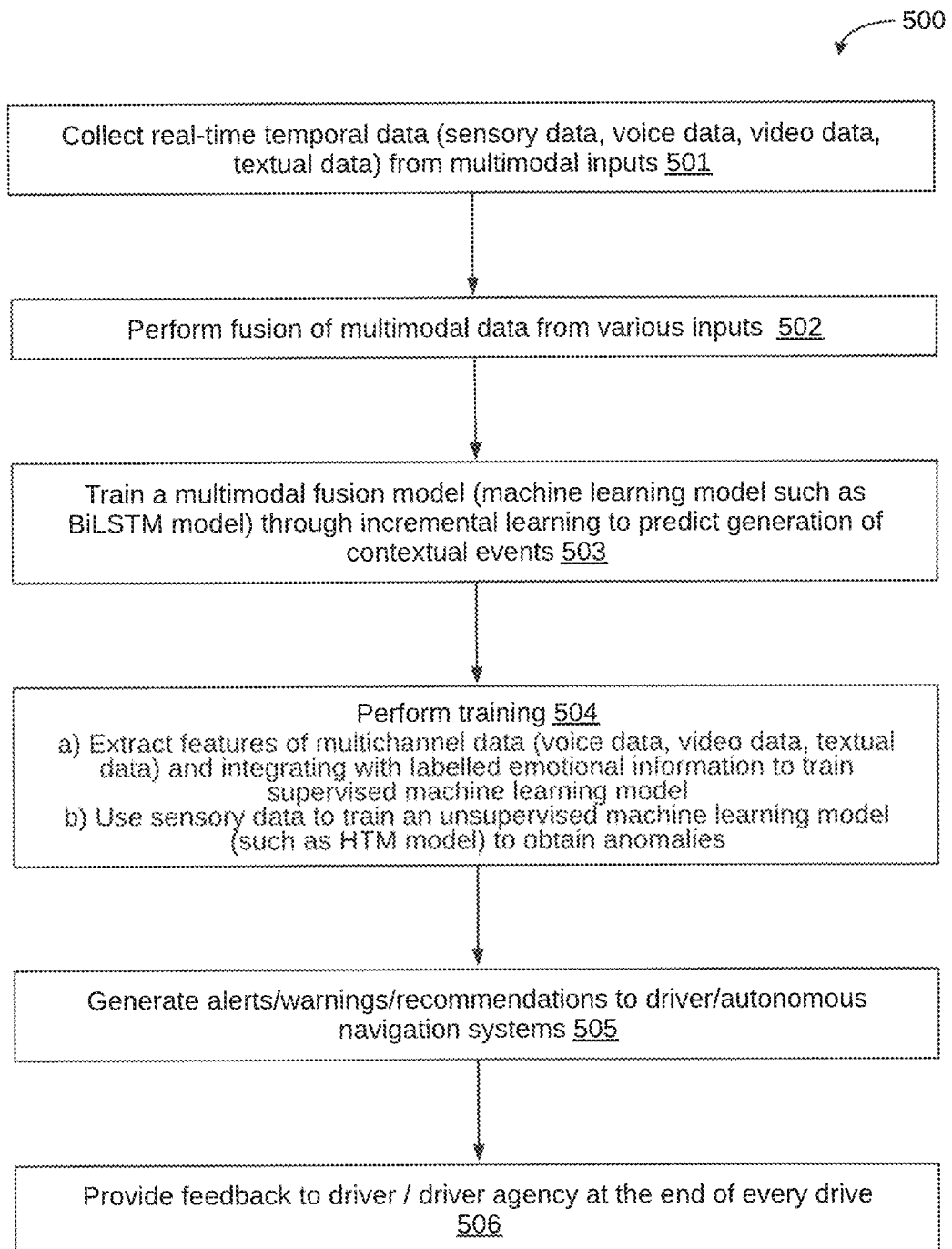
FIG. 5 is a flow diagram of a detailed exemplary process for providing personalized driving assistance, in accordance with some embodiments of the present disclosure.

Referring now to FIG. 5, an exemplary process 500 for providing personalized driving assistance based on incremental learning is depicted in greater detail via a flowchart, in accordance with some embodiments of the present disclosure. At step 501, the real-time temporal input data from multimodal inputs such as sensory data from onboard sensors (such as accelerometer sensor, gyroscope sensor, magnetometer sensor, brake sensor, etc.) and multi-channel input data from cameras (such as face camera, hand camera, outside camera, GPS data, etc.) present in the vehicle may be collected. At step 502, the data collected from multimodal inputs may be combined to create a multi-modal fusion data. The multi-modal fusion data may be subsequently used for generation of contextual events by deriving at a common inference.

At step 503, a multi-modal fusion model such as Bi-directional LSTM model may be trained, using the multi-modal fusion data, through incremental learning methods in order to predict the generation of contextual events. The generation of contextual events may include, but may not be limited to, predicting driver actions, emotions, gestures etc. and predicting anomalies in driver behavior or vehicle components. The prediction of driver actions, emotions, gestures, etc. may further include, but may not be limited to, predicting real time events such as lane change, over-taking, driver's drowsiness, drinking prediction, vehicle acceleration, and turning deviations. Similarly, the prediction of anomalies may include, but may not be limited to, predicting anomalies in driver behavior, vehicle components, vehicle movement, predicting new pattern in behavior, and predicting vehicle state. Thus, by predicting the generation of contextual events, enhanced or personalized driving assistance may be provided. Such personalized assistance may help drivers/vehicles in adapting to new scenario such as traffic/weather/road conditions.

At step 504, the multi-modal fusion model such as bi-directional LSTM model may be trained in two sub-steps. In first sub-step, the model may be trained to predict driver's actions, emotions, gestures, etc. based on multi-channel input data. The multi-channel input data that consists of raw voice data, video data, and textual data may be collected, and their features may be extracted. The extracted features of multi-channel input data (voice data, video data, textual data) may be then integrated with uniquely labelled emotion information for training a supervised machine learning model (such as bi-directional LSTM model) to predict the driver actions, emotions, etc.

In second sub-step, the model may be trained to predict anomalies or new patterns using sensory data. The sensory data derived from various onboard sensors (e.g., accelerometer, gyroscope, magnetometer, brake sensor, etc.) in the vehicle may be used to train an unsupervised machine learning model (e.g., HTM model) for predicting anomalies or new behavior patterns. The anomalies may include anomalies in vehicle components (e.g., brake failure, low battery, etc.), anomalies, in vehicle movement, anomalies in passenger behavior patterns etc. Similarly, new behavior patterns may include previously unknown behavior of passengers (i.e., drivers or co-passengers).

The anomaly information may be matched with the fusion model output to derive a common inference for the generation of contextual events, For example, the multi-channel input data may provide information that the driver is angry, and he is planning to overtake or change lane. Similarly, using the sensory variables, an anomaly in driver behavior may also be obtained. The information obtained from multi-channel input data and the sensory data may be matched to derive a common inference. Thus, a contextual event that indicates that the driver is angry and is planning to change lane may be generated.

Upon generation of contextual events, at step 505, the control logic 500 may analyze driver's gestures, emotions and may predict events such as driver lane change, driver's intention to overtake, etc. beforehand. Hence, necessary alerts/warnings (such as alert in case driver drowsiness prediction, alert regarding driver lane change, etc.) may be provided for assisting the driver. In case of autonomous vehicles, for providing similar alerts to the navigation device, co-passenger's gestures, emotions may be analyzed, and alerts may be generated regarding the state of the vehicle. Similarly, by predicting the anomalies in vehicle movement, or vehicle parts as well as movements in case of autonomous vehicles, or in driver behavior in case of ADAS driven vehicles, necessary alerts/warnings may be generated in order to provide driving personalization regarding vehicle state, component repair, etc. Further, at step 506, at the end of every drive, personalized driving feedbacks may be provided to drivers and the driving agency, for their improvement.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The disclosed methods and systems may be implemented on a conventional or a general-purpose computer system, such as a personal computer (PC) or server computer.

Figure 6:
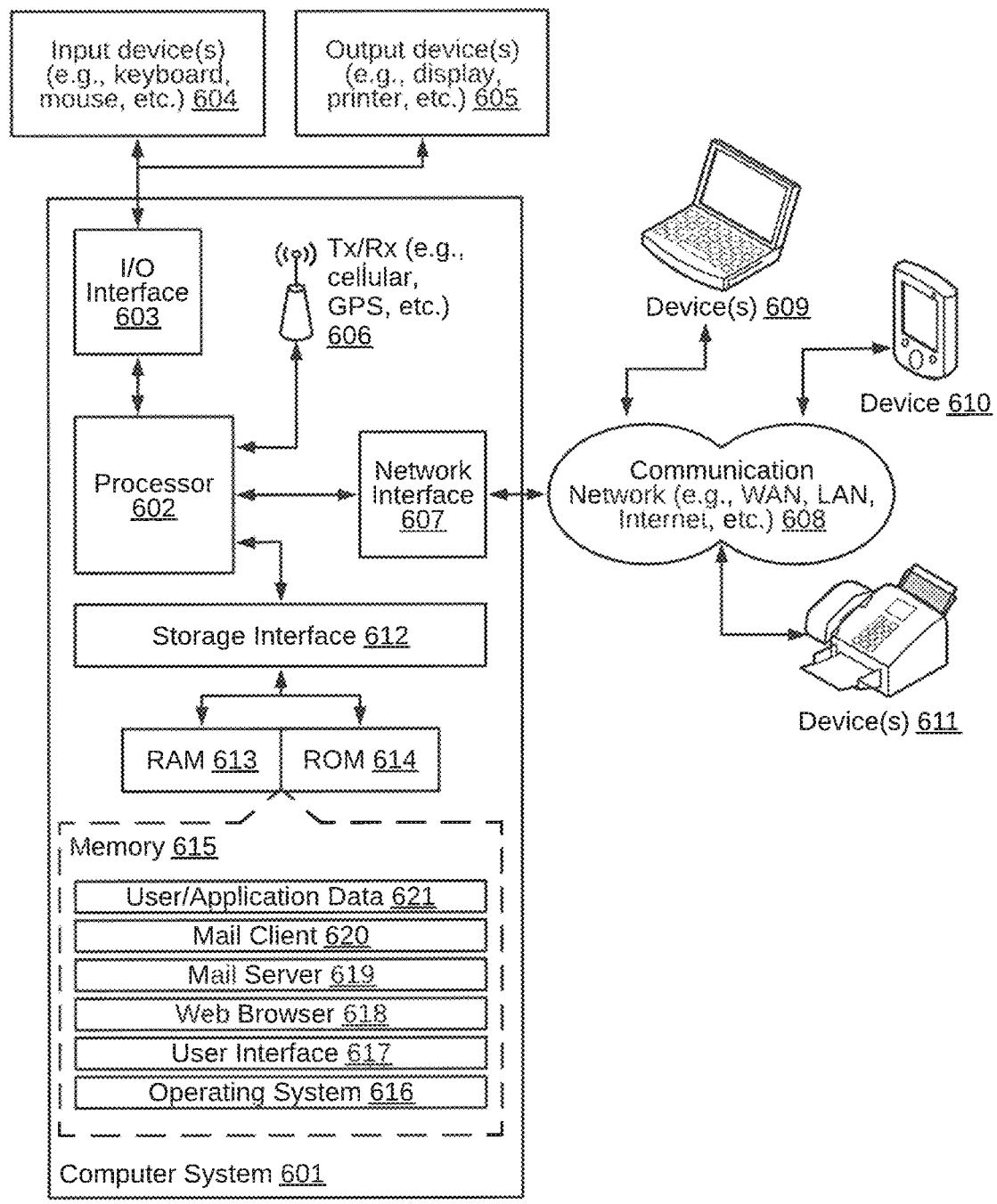
FIG. 6 is a block diagram of an exemplary computer system for implementing embodiments consistent with the present disclosure.

Referring now to FIG. 6, a block diagram of an exemplary computer system 601 for implementing embodiments consistent with the present disclosure is illustrated. Variations of computer system 601 may be used for implementing driver assistance device 101 or the navigation device in the system 100. Computer system 601 may include a central processing unit ("CPU" or "processor") 602. Processor 602 may include at least one data processor for executing program components for executing user-generated or system-generated requests. A user may include a person, a person using a device such as those included in this disclosure, or such a device itself. The processor 602 may include specialized processing units such as integrated system (bus) controllers, memory management control units, floating point units, graphics processing units, digital signal processing units, etc. The processor 602 may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n /b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver 606 may facilitate various types of wireless transmission or reception. For example, the transceiver 606 may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface 607 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices 609, 610, and 611 may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 601 may itself embody one or more of these devices 609, 610, and 611.

In some embodiments, the processor 602 may be disposed in communication with one or more memory devices 615 (e.g., RAM 613, ROM 614, etc.) via a storage interface 612. The storage interface 612 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 615 may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems 616 include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 617 may facilitate display, execution, interaction, manipulation, or operation of program components through textual or graphical facilities. For example, user interfaces 617 may provide computer interaction interface elements on a display system operatively connected to the computer system 601, such as cursors, icons, check boxes, menus, strollers, windows, widgets, etc. Graphical user interfaces (GUIs) may be employed, including, without limitation, APPLE® MACINTOSH® operating systems' AQUA® platform, IBM OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 601 may implement a web browser 618 stored program component. The web browser 618 may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers 618 may utilize facilities such as AJAX®, DHTML, ADOBE® FLASH®, JAVASCRIPT®, JAVA®, application programming interfaces (APIs), etc. In some embodiments, the computer system 601 may implement a mail server 619 stored program component. The mail server 619 may be an Internet mail server such as MICROSOFT® EXCHANGE®, or the like. The mail server 619 may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server 619 may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 601 may implement a mail client 620 stored program component. The mail client 620 may be a mail viewing application, such as APPLE MAIL®, MICROSOFT ENTOURAGE®, MICROSOFT OUTLOOK®, MOZILLA THUNDERBIRD®, etc.

In some embodiments, computer system 601 may store user/application data 621, such as the data, variables, records, etc. (e.g., sensory data with respect to the vehicle, multi-channel input data with respect to the passengers, one or more features extracted from the multi-channel input data, unique emotion labels, labelled feature data, multi-modal fusion data, SDR data, contextual events, Bi-directional LSTM model, HTM model, personalized driving recommendations, historical vehicle usage data, historical behavior data of the driver passenger, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above are not routine, or conventional or well understood in the art. As will be appreciated, existing techniques do not support driving personalization based on capturing of gestures/emotions of co-passengers from the multi-modal fusion data. Additionally, existing techniques do not provide for prediction of anomalies of vehicle parts/driver behavior using unsupervised machine learning. In particular, existing techniques fail to provide personalized driving assistance based on incremental learning technique that employ a combination of supervised and unsupervised learning.

In contrast, the techniques discussed above provide for prediction of driver intentions, system repairs due to anomalies, etc. based on incremental learning, which may help in providing personalized driving assistance for enhanced safety and mobility. Further, the techniques discussed above provide for personalized driving assistance based on vehicle usage history and exploitation of available temporal information using supervised and unsupervised machine learning methods. The techniques make use of gestures/emotions of co-passengers in anomaly predictions and driving personalization. The technique may be employed in ADAS enabled vehicle as well as in semi-autonomous/autonomous vehicles.

The specification has described method and system for providing personalized driving assistance based on incremental learning. The illustrated steps are set out to explain the exemplary embodiments shown, and it should be anticipated that ongoing technological development would change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of providing personalized driving assistance, the method comprising:
    receiving, by a driver assistance device, sensory data with respect to a vehicle from a plurality of sensors and multi-channel input data with respect to one or more passengers inside the vehicle from a plurality of onboard monitoring devices;
    performing, by the driver assistance device, fusion of the sensory data and the multi-channel input data to generate multi-modal fusion data;
    determining, by the driver assistance device, one or more contextual events based on the multi-modal fusion data using a machine learning model, wherein the machine learning model is trained using an incremental learning process and comprises a supervised machine learning model and an unsupervised machine learning model, wherein training the machine learning model using the incremental learning process comprises:
        extracting one or more features from the multi-channel input data;

labelling each of the one or more features with a unique emotion label to generate a labelled feature data; and
performing a supervised training of the supervised machine learning model with the labelled feature data to determine the one or more contextual events;
analyzing, by the driver assistance device, the one or more contextual events to generate a personalized driving recommendation; and
providing, by the driver assistance device, the personalized driving recommendation to a driver passenger or a navigation device.

2. The method of claim 1, wherein the plurality of sensors comprise at least one of an accelerometer, a speedometer, a gyroscope, a magnetometer, a brake sensor, an outside imaging sensor, a GPS sensor, a humidity sensor, or a temperature sensor, and wherein the plurality of onboard monitoring devices comprise at least one of an inside camera, a driver passenger face camera, a microphone, or a driver passenger breath analyzer.

3. The method of claim 1, wherein the supervised machine learning model comprises a bi-directional long short-term memory (Bi-directional LSTM) model.

4. The method of claim 1, wherein the one or more contextual events comprise at least one of an action, a gesture, or an emotion of the one or more passengers.

5. The method of claim 1, wherein training the machine learning model using the incremental learning process further comprises:
semantically encoding the sensory data to generate sparse distributed representation (SDR) data; and
performing an unsupervised training of the unsupervised machine learning model with the SDR data to determine the one or more contextual events.

6. The method of claim 5, wherein the one or more contextual events comprise anomalies in at least one of a component of the vehicle, a movement of the vehicle, or a behavior of the one or more passengers.

7. The method of claim 5, wherein the unsupervised machine learning model comprises a hierarchical temporal memory (HTM) model.

8. The method of claim 1, wherein performing fusion to generate multi-modal fusion data comprises performing fusion of at least one of historical vehicle usage data and historical behavior data of the driver passenger with the multi-channel input data and the sensory data.

9. A system for providing personalized driving assistance, the system comprising:
a driver assistance device comprising at least one processor and a computer-readable medium storing instructions that, when executed by the at least one processor, cause the at least one processor to perform operations comprising:
receiving sensory data with respect to a vehicle from a plurality of sensors and multi-channel input data with respect to one or more passengers inside the vehicle from a plurality of onboard monitoring devices;
performing fusion of the sensory data and the multi-channel input data to generate multi-modal fusion data;
determining one or more contextual events based on the multi-modal fusion data using a machine learning model, wherein the machine learning model is trained using an incremental learning process and comprises a supervised machine learning model and an unsupervised machine learning model, wherein training the machine learning model using the incremental learning process comprises:
extracting one or more features from the multichannel input data;
labelling each of the one or more features with a unique emotion label to generate a labelled feature data; and
performing a supervised training of the supervised machine learning model with the labelled feature data to determine the one or more contextual events;
analyzing the one or more contextual events to generate a personalized driving recommendation; and
providing the personalized driving recommendation to a driver passenger or a navigation device.

10. The system of claim 9, wherein the plurality of sensors comprise at least one of an accelerometer, a speedometer, a gyroscope, a magnetometer, a brake sensor, an outside imaging sensor, a GPS sensor, a humidity sensor, or a temperature sensor, and wherein the plurality of onboard monitoring devices comprise at least one of an inside camera, a driver passenger face camera, a microphone, or a driver passenger breath analyzer.

11. The system of claim 9, wherein the supervised machine learning model comprises a bi-directional long short-term memory (Bi-directional LSTM) model, and wherein the one or more contextual events comprise at least one of an action, a gesture, or an emotion of the one or more passengers.

12. The system of claim 9, wherein training the machine learning model using the incremental learning process further comprises:
semantically encoding the sensory data to generate sparse distributed representation (SDR) data; and
performing an unsupervised training of the unsupervised machine learning model with the SDR data to determine the one or more contextual events.

13. The system of claim 12, wherein the unsupervised machine learning model comprises a hierarchical temporal memory (HTM) model, and wherein the one or more contextual events comprise anomalies in at least one of a component of the vehicle, a movement of the vehicle, or a behavior of the one or more passengers.

14. The system of claim 9, wherein performing fusion to generate multi-modal fusion data comprises performing fusion of at least one of historical vehicle usage data and historical behavior data of the driver passenger with the multi-channel input data and the sensory data.

15. A non-transitory computer-readable medium storing computer-executable instructions for providing personalized driving assistance, the computer-executable instructions are for:
receiving sensory data with respect to a vehicle from a plurality of sensors and multi-channel input data with respect to one or more passengers inside the vehicle from a plurality of onboard monitoring devices;
performing fusion of the sensory data and the multi-channel input data to generate multi-modal fusion data;
determining one or more contextual events based on the multi-modal fusion data using a machine learning model, wherein the machine learning model is trained using an incremental learning process and comprises a supervised machine learning model and an unsupervised machine learning model, wherein training the machine learning model using the incremental learning process comprises:

extracting one or more features from the multi-channel input data;

labelling each of the one or more features with a unique emotion label to generate a labelled feature data; and performing a supervised training of the supervised machine learning model with the labelled feature data to determine the one or more contextual events;

analyzing the one or more contextual events to generate a personalized driving recommendation; and providing the personalized driving recommendation to a driver passenger or a navigation device.

16. The non-transitory computer-readable medium of claim 15, wherein training the machine learning model using the incremental learning process further comprises:

semantically encoding the sensory data to generate sparse distributed representation (SDR) data; and performing an unsupervised training of the unsupervised machine learning model with the SDR data to determine the one or more contextual events.

17. The non-transitory computer-readable medium of claim 15, wherein performing fusion to generate multi-modal fusion data comprises performing fusion of at least one of historical vehicle usage data and historical behavior data of the driver passenger with the multi-channel input data and the sensory data.

* * * * *